US012033338B2

(12) United States Patent
Nekkah et al.

(10) Patent No.: US 12,033,338 B2
(45) Date of Patent: *Jul. 9, 2024

(54) POINT CLOUD ALIGNMENT SYSTEMS FOR GENERATING HIGH DEFINITION MAPS FOR VEHICLE NAVIGATION

(71) Applicant: MOTIONAL AD LLC, Boston, MA (US)

(72) Inventors: Sherif Ahmed Morsy Nekkah, Singapore (SG); Nicole Alexandra Camous, Singapore (SG); Sergi Adipraja Widjaja, Singapore (SG); Venice Erin Baylon Liong, Singapore (SG); Xiaogang Wang, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,421

(22) Filed: Mar. 31, 2023

(65) Prior Publication Data
US 2024/0054661 A1 Feb. 15, 2024

Related U.S. Application Data

(63) Continuation of application No. 17/885,949, filed on Aug. 11, 2022.

(51) Int. Cl.
*G06T 7/33* (2017.01)
*G06T 3/00* (2006.01)
(Continued)

(52) U.S. Cl.
CPC ............ *G06T 7/337* (2017.01); *G06T 3/0031* (2013.01); *G06T 3/4046* (2013.01); *G06T 3/60* (2013.01);
(Continued)

(58) Field of Classification Search
CPC .......... B60W 2420/52; B60W 60/001; B60W 2050/0005; B60W 2050/0022;
(Continued)

(56) References Cited

U.S. PATENT DOCUMENTS 11,397,242 B1 * 7/2022 Zhang ................ G06V 10/806
11,521,394 B2 * 12/2022 Beijbom ................ G06N 3/08
(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — Ian L Lemieux
(74) *Attorney, Agent, or Firm* — Fish & Richardson P.C.

(57) ABSTRACT

A method for determining a trajectory of a vehicle within a physical space based at least on an aligned point cloud may include generating a fused feature map by concatenating a first feature map corresponding to a source point cloud and a second feature map corresponding to a target point cloud. A machine learning model may be applied to determine, based at least on the fused feature map, a relative transform aligning the target point cloud to the source point cloud. An aligned target point cloud may be generated by transforming the target point cloud in accordance with the relative transform. Furthermore, a trajectory of a vehicle within the physical space may be determined based on at least the first relative transform. Related systems and computer program products are also provided.

28 Claims, 13 Drawing Sheets

(51) Int. Cl.
*G06T 3/4046* (2024.01)
*G06T 3/60* (2006.01)

(52) U.S. Cl.
CPC .............. *G06T 2207/10028* (2013.01); *G06T 2207/20081* (2013.01); *G06T 2207/20084* (2013.01); *G06T 2207/20221* (2013.01); *G06T 2207/30241* (2013.01); *G06T 2207/30252* (2013.01)

(58) Field of Classification Search
CPC ... B60W 2050/0026; B60W 2050/005; B60W 2420/00; B60W 30/10; B60W 40/06; B60W 40/10; G01S 17/89; G01S 17/931; G01S 17/86; G01S 2013/9316; G01S 13/865; G01S 13/87; G01S 13/89; G01S 13/931; G01S 15/42; G01S 15/87; G01S 15/89; G01S 15/931; G01S 17/42; G01S 17/87; G01S 17/88; G01S 7/003; G01S 7/4808; G01S 7/497; G01S 7/53; G06V 10/764; G06V 10/82; G06V 20/56; G06V 10/74; G06V 10/7715; G06V 10/776; G06V 10/809; G06V 20/182; G06V 10/44; G06V 10/75; G06V 20/58; G06V 20/64; G06V 20/70; G06T 2207/10028; G06T 7/30; G06T 9/001; G06T 9/002; G06T 2207/30248; G06T 3/0068; G06T 7/33; G06T 7/579; G06T 7/62; G06N 3/045; G06N 3/08; G06N 3/084; G06N 20/00; G06N 20/10; H04N 19/597

See application file for complete search history.

(56) References Cited

U.S. PATENT DOCUMENTS

| | | | |
|---|---|---|---|
| 11,698,437 B2* | 7/2023 | Gerardo Castro | G01S 7/417 382/158 |
| 2017/0046840 A1* | 2/2017 | Chen | G01C 21/36 |
| 2020/0043186 A1* | 2/2020 | Selviah | G06T 7/33 |
| 2020/0082560 A1* | 3/2020 | Nezhadarya | G06T 17/10 |
| 2021/0358137 A1* | 11/2021 | Lee | G06T 7/246 |
| 2021/0405638 A1* | 12/2021 | Boyraz | G06V 20/64 |
| 2022/0164566 A1* | 5/2022 | Ye | G06F 18/213 |
| 2022/0414821 A1* | 12/2022 | Zhu | G06T 7/33 |
| 2023/0074860 A1* | 3/2023 | Camous | G06V 10/764 |
| 2023/0177719 A1* | 6/2023 | Babin | G06T 7/74 701/445 |
| 2023/0182774 A1* | 6/2023 | Wang | G01S 7/4808 701/23 |

OTHER PUBLICATIONS cvlibs.net [online], "Visual Odometry / SLAM Evaluation 2012," 2012, retrieved Oct. 12, 2023, retrieved from URL <https://www.cvlibs.net/datasets/kitti/eval_odometry.php>, 10 pages.
Dai et al., "Deformable Convolutional Networks," CoRR, revised Jun. 5, 2017, arXiv:1703.06211, 12 pages.
International Search Report and Written Opinion in International Appln. No. PCT/US2023/029721, dated Sep. 15, 2023, 8 pages.
Lang et al., "PointPillars: Fast Encoders for Object Detection from Point Clouds," CoRR, revised May 7, 2019, arXiv:1812.05784, 9 pages.
nuscenes.org [online], "nuPlan," 2020, retrieved on Oct. 12, 2023, retrieved from URL <https://www.nuscenes.org/nuplan>, 10 pages.
Segal et al., "Generalized-ICP," Robotics: Science and Systems, 2009, 2(4):435, 8 pages.

* cited by examiner

POINT CLOUD ALIGNMENT SYSTEMS FOR GENERATING HIGH DEFINITION MAPS FOR VEHICLE NAVIGATION

CROSS REFERENCE TO RELATED APPLICATIONS

The present application is a continuation of U.S. patent application Ser. No. 17/885,949, filed Aug. 11, 2022, entitled "POINT CLOUD ALIGNMENT SYSTEMS FOR GENERATING HIGH DEFINITION MAPS FOR VEHICLE NAVIGATION", which is incorporated by reference herein.

BACKGROUND

An autonomous vehicle is capable of sensing and navigating through its surrounding environment with minimal to no human input. To safely navigate the vehicle along a selected path, the vehicle may rely on a motion planning process to generate, update, and execute one or more trajectories through its immediate surroundings. The trajectory of the vehicle may be generated based on the current condition of the vehicle itself and the conditions present in the vehicle's surrounding environment, which may include mobile objects such as other vehicles and pedestrians as well as immobile objects such as buildings and street poles. For example, the trajectory may be generated to avoid collisions between the vehicle and the objects present in its surrounding environment. Moreover, the trajectory may be generated such that the vehicle operates in accordance with other desirable characteristics such as path length, ride quality or comfort, required travel time, observance of traffic rules, adherence to driving practices, and/or the like.

DETAILED DESCRIPTION

Figure 1:
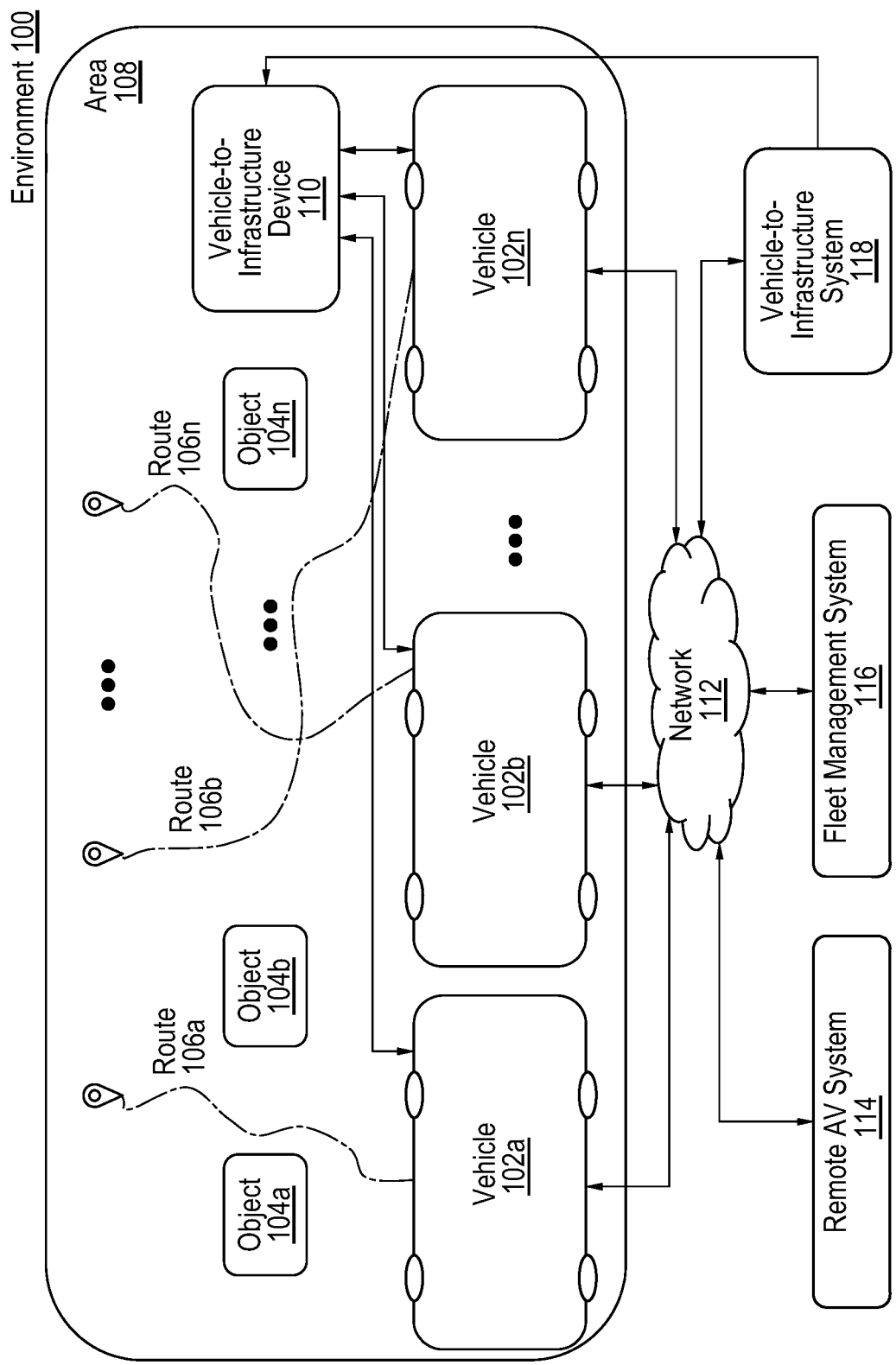
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a machine learning model for a vehicle that determines a trajectory of a vehicle within a physical space based on at least the first relative transform (e.g. a target point cloud that is aligned to a source point cloud). It is noted that the source point cloud and the target point cloud are three dimensional point clouds. Such alignment enables the generation of accurate and reliable high definition maps that may be utilized by the vehicle to navigate safely within at least a portion of the physical space. In some instances, the aligned target point cloud may be further aligned with the source point cloud to further improve HD map generation. Vehicle trajectories determined using these maps improve the chances of avoiding collisions between the vehicle and other vehicles, pedestrians, etc. Moreover, these determined trajectories ensure that vehicles operate in compliance with traffic rules, driving best practices, and so forth. It is noted that the trajectory that is determined may be associated with past paths on which the vehicle has traveled, and alternatively, may also be associated with future paths upon which the vehicle may travel.

By virtue of the implementation of systems, methods, and computer program products described herein, techniques for determining one or more relative transforms for point cloud alignment as well as for training a machine learning model to determine one or more relative transforms are provided. For example, a machine learning model may be trained to determine a first relative transform for aligning a target point cloud with a source point cloud and a second relative transform for further aligning the aligned target point cloud with the source point cloud. The alignment may include a translation along at least one of an x-axis, a y-axis, and a z-axis, in addition to or alternatively, a rotation around a fixed point of 0 radians about a unit axis (X, Y, Z). Determining the first and second relative transforms may include performing a weighted subsampling by a convolution layer (e.g., 1×1 convolution layer), flattening a combined feature map into a one-dimensional vector, and processing the one-dimensional vector with a fully connected layer of the machine learning model. Moreover, in embodiments, the machine learning model may be pre-trained to determine relative transforms. Pre-training may include reconstructing, a point cloud by at least decoding an encoding of the point cloud that is deformed by one or more offsets and adjusting the machine learning model to minimize a difference between the point cloud and the decoded point cloud. In this way, the machine learning model may be trained to generate one or more relative transforms that serve to align point clouds for generating high definition maps that facilitate safe vehicle navigation.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other comparable devices. In some embodiments, remote AV system 114 is co-located with the fleet management system 116. In some embodiments, remote AV system 114 is involved in the installation of some or all of the components of a vehicle, including an autonomous system, an autonomous vehicle computer, software implemented by an autonomous vehicle computer, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
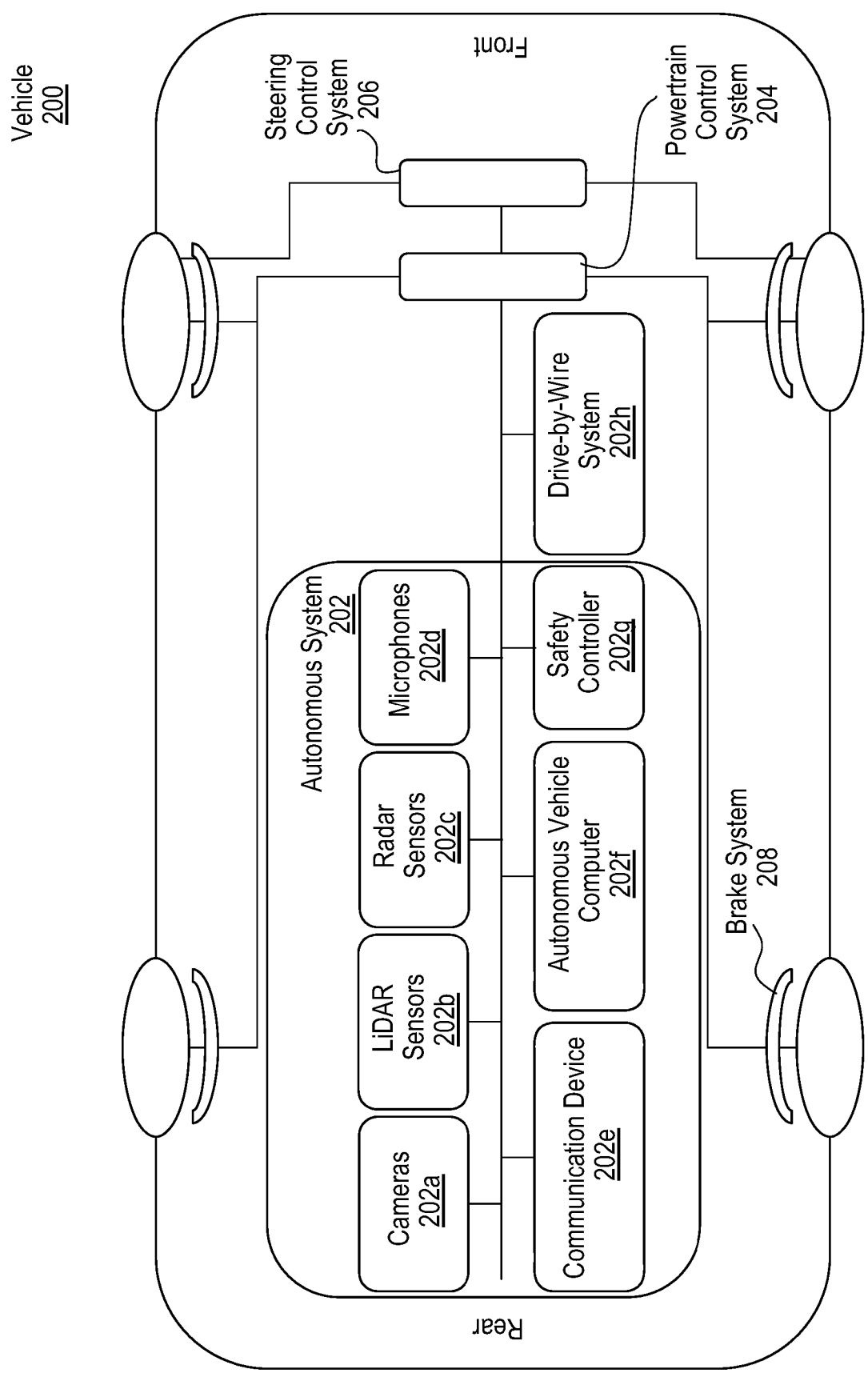
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle computer 202f, drive-by-wire (DBW) system 202h, and safety controller 202g.

Figure 3:
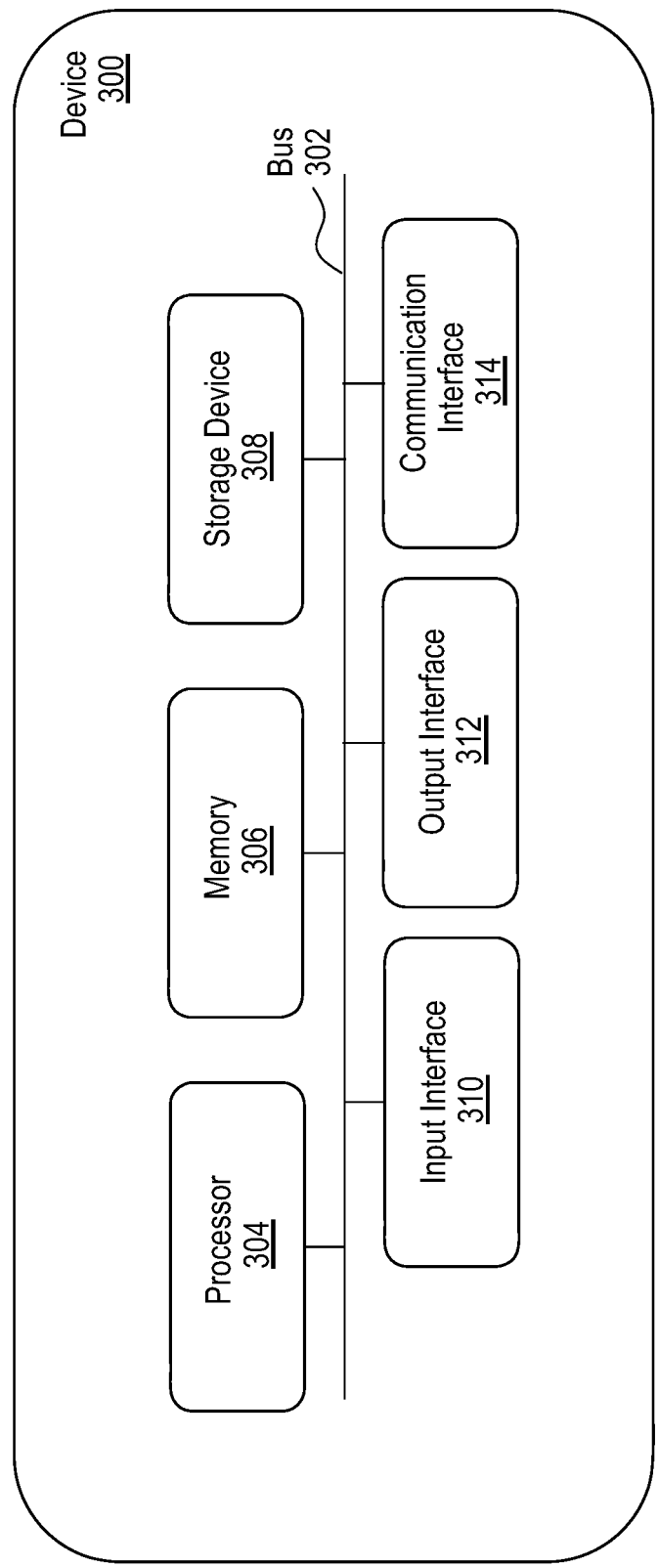
FIG. 3 is a diagram of components of one or more devices and/or one or more systems of FIGS. 1 and 2.

Cameras 202a include at least one device configured to be in communication with communication device 202e, autonomous vehicle computer 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle computer 202f and/or a fleet management system (e.g., a fleet management system that is the same as or similar to fleet management system 116 of FIG. 1). In such an example, autonomous vehicle computer 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle computer 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle computer 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle computer 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle computer 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle computer 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle computer 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle computer 202f is the same as or similar to autonomous vehicle computer 400, described herein. Additionally, or alternatively, in some embodiments, autonomous vehicle computer 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle computer 202f.

DBW system 202h includes at least one device configured to be in communication with communication device 202e and/or autonomous vehicle computer 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of the system 500, and/or one or more devices of network 112 (e.g., one or more devices of a system of network 112). In some embodiments, one or more devices of vehicles 102 (e.g., one or more devices of a system of vehicles 102), one or more devices of the system 500, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle computer 400 (sometimes referred to as an "AV stack"). As illustrated, autonomous vehicle computer 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle computer 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle computer 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle computer 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle computer 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle computer 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
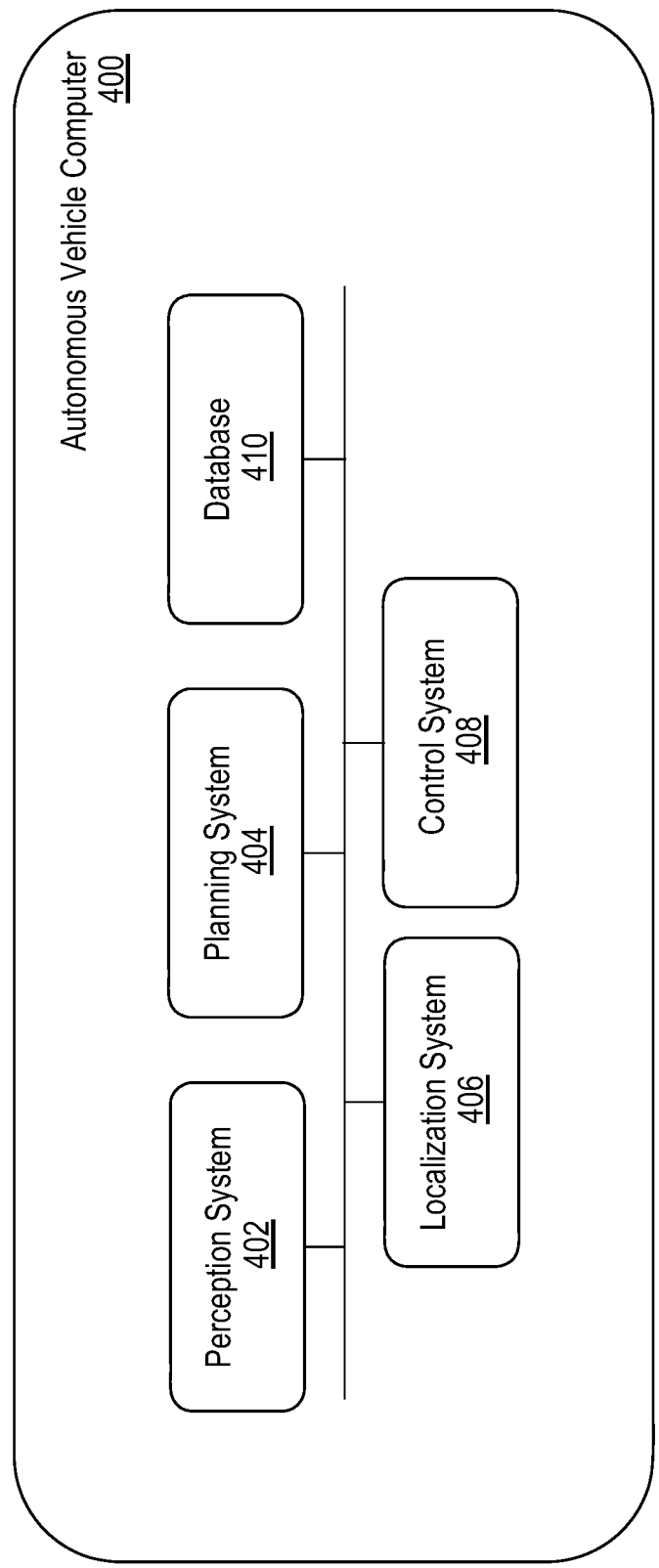
FIG. 4A is a diagram of certain components of an autonomous system.
Figure 4B:
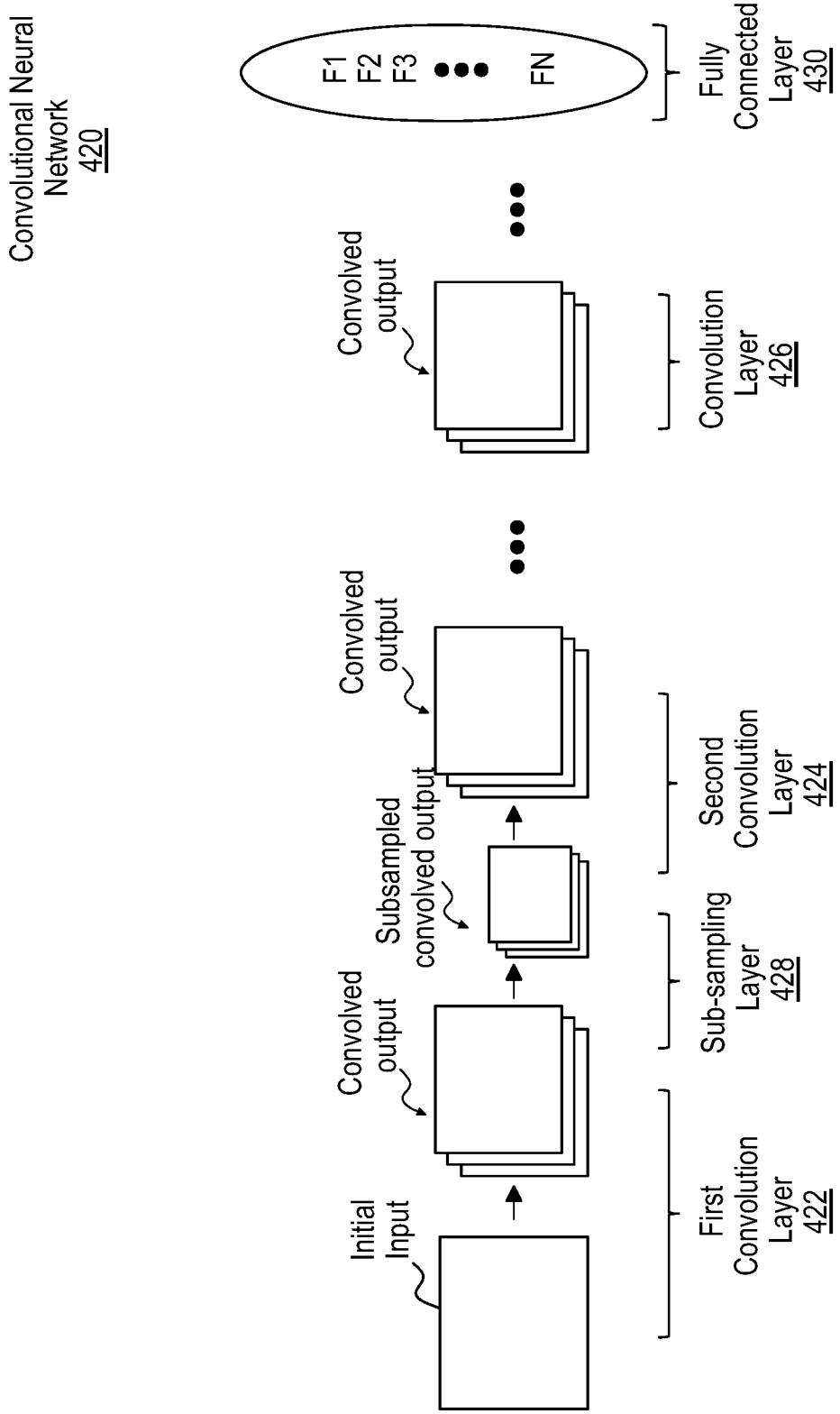
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments, perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
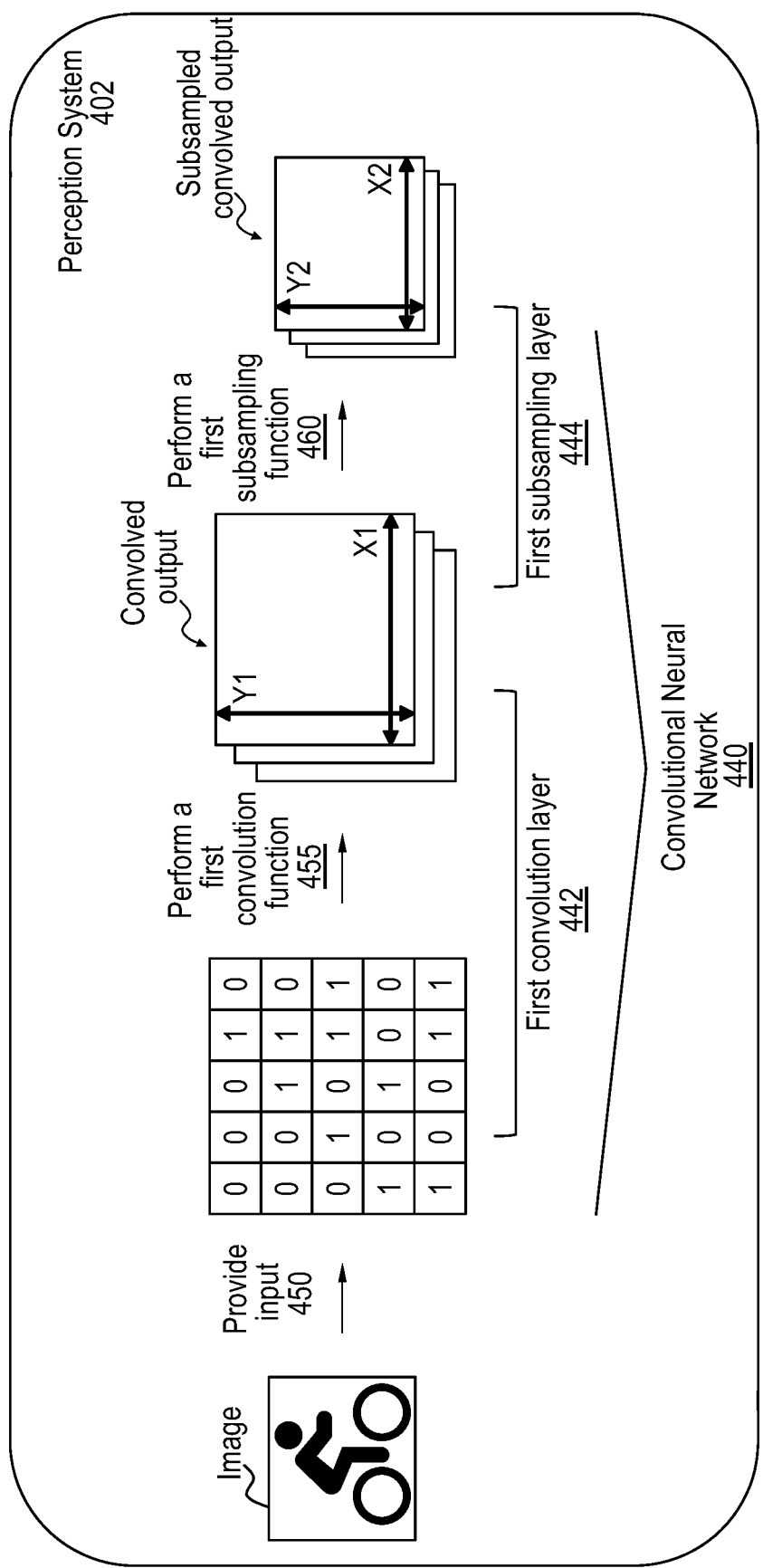
FIGS. 4C and 4D are a diagram illustrating example operation of a CNN.
Figure 4D:
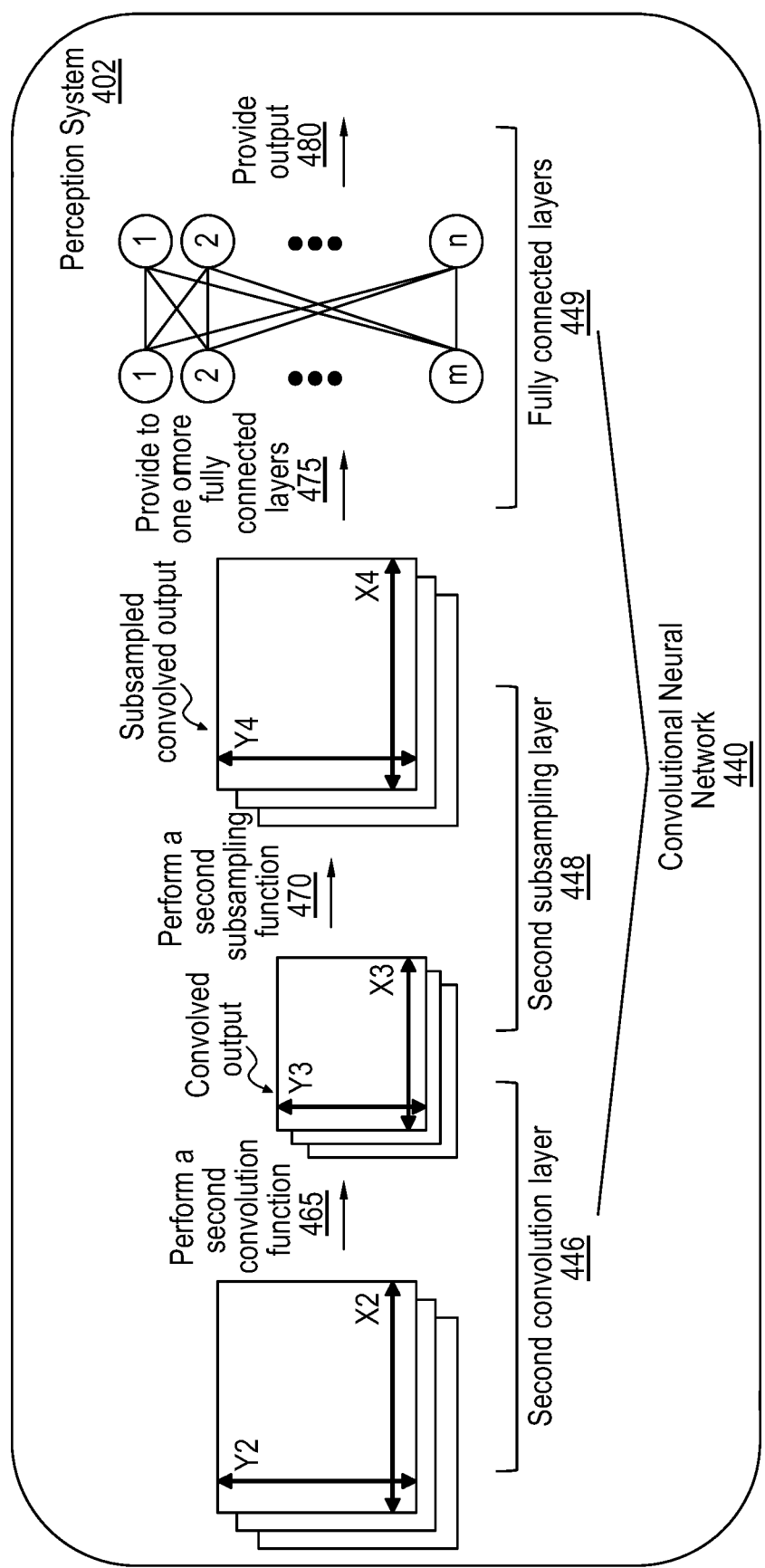

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
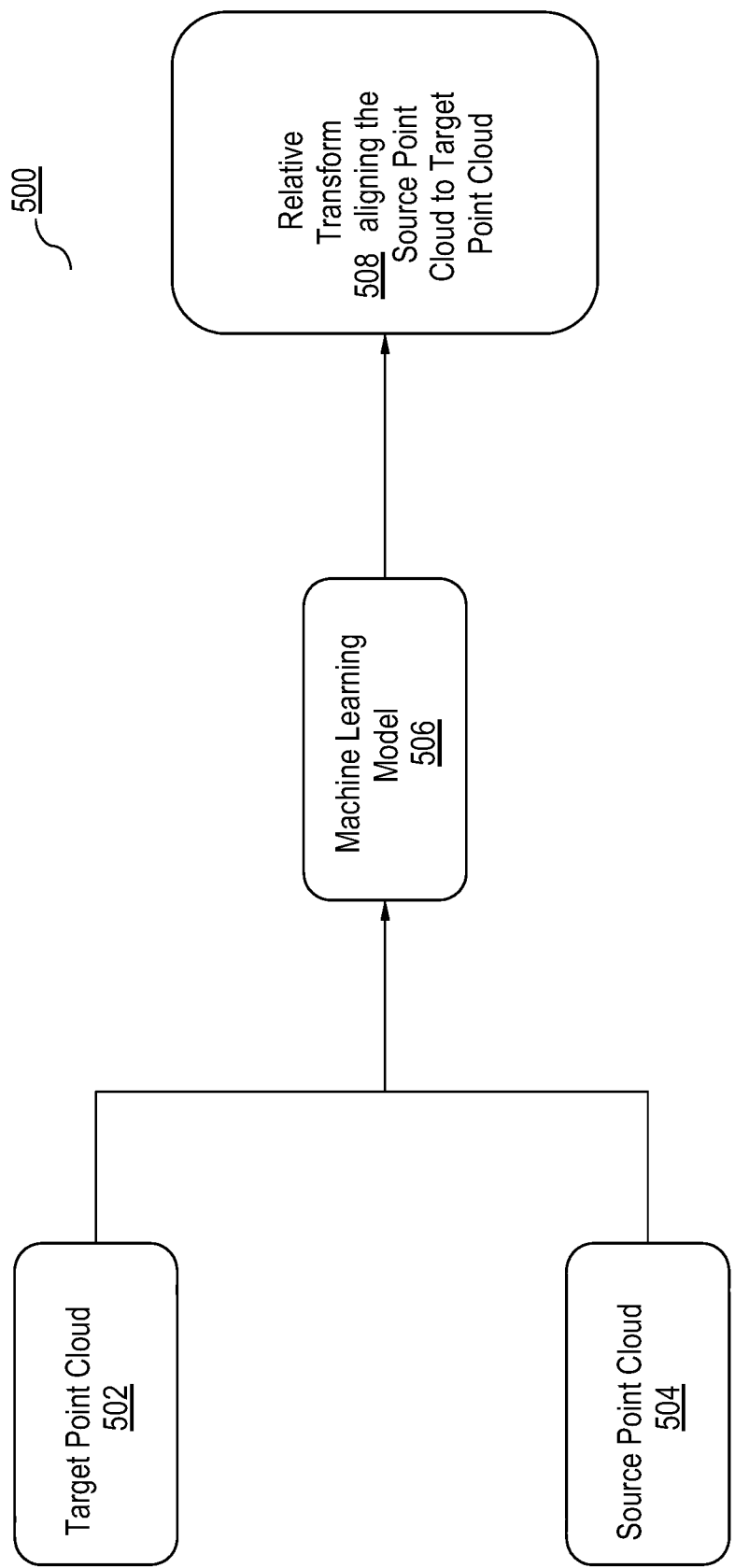
FIG. 5 is a block diagram of a system for determining a trajectory of a vehicle within a physical space.

FIG. 5 is a high level block diagram of a system for determining a trajectory of a vehicle within a physical space. It is noted that the trajectory may refer to a path or route upon which the vehicle has previously traveled or a predicted path or route upon which the vehicle may travel in the future. In embodiments, the autonomous vehicle computer 400, included as part of the vehicle 102, may apply a machine learning model 506 trained to determine a relative transform between multiple point clouds. For example, the machine learning model 506 may receive as inputs, a target point cloud 502 and a source point cloud 504 and determine, based on these inputs, a relative transform 508. The relative transform 508 may be utilized to align the target point cloud 502 to the source point cloud 504 and also to determine a trajectory of a vehicle, e.g., within an environment that is external to the vehicle. Each of the target point cloud 502 and the source point cloud 504 may be three-dimensional point clouds that comprise a collections of points, in three-dimensional space, that are representative of various attributes of a physical space that is external to an autonomous vehicle (e.g., vehicle 102 shown in FIG. 1, vehicle 200 shown in FIG. 2, etc.).

For example, the points within each of the target point cloud 502 and the source point cloud 504 may represent attributes specific to one or more objects located within a proximity of the vehicle in the physical space. Non-limiting examples of the physical space may be at least a portion of a street, a highway, a city block, or a city intersection thorough which the vehicle may be navigating. While traveling through such a physical space, the LiDAR sensors 202$b$ of the vehicle may capture, in real time, point cloud information representative of one or more objects such as, e.g., pedestrians, road signs, traffic signs, buildings, other vehicles, and/or the like. Each point of the target point cloud 502 and the source point cloud 504 may include various components that describe attributes of the physical space. For example, each point of the point clouds may include coordinate information (e.g., x, y, and z coordinates), in addition to information about intensity and depth. Intensity information may be based on the return strength of light detected by the LiDAR sensors, while depth information may be associated with distance information relative to the LiDAR sensors. One or more of the coordinate information, intensity information, and depth information may be utilized by the autonomous vehicle computer 400 to determine details about the dimensions of the one or more objects present in the physical space, distances between each of these objects (e.g., pedestrians, road signs, traffic signs, buildings, other vehicles, and/or the like) and the vehicle within the physical space, and/or the like. For example, the target point cloud 502 and the source point cloud 504 may, based on the position of the LiDAR sensors on the vehicle, capture different perspective views of at least a portion of the same physical space. As a non-limiting example, both the target point cloud 502 and the source point cloud 504 may capture varying perspective views of the same city block, city-street, pedestrian, etc.

The autonomous vehicle computer 400 may apply a machine learning model to determine a relative transform aligning the target point cloud 502 to the source point cloud 504. For example, the target point cloud 502 may be translated and rotated such that the target point cloud 502 is aligned with the orientation of the source point cloud 504, e.g., the target point cloud 502 may be aligned to the source point cloud 504 within the coordinate system of the source point cloud 504. In some embodiments, an additional relative transformed may be determined, which may enable further alignment of the target point cloud 502 to the source point cloud 504.

Figure 6:
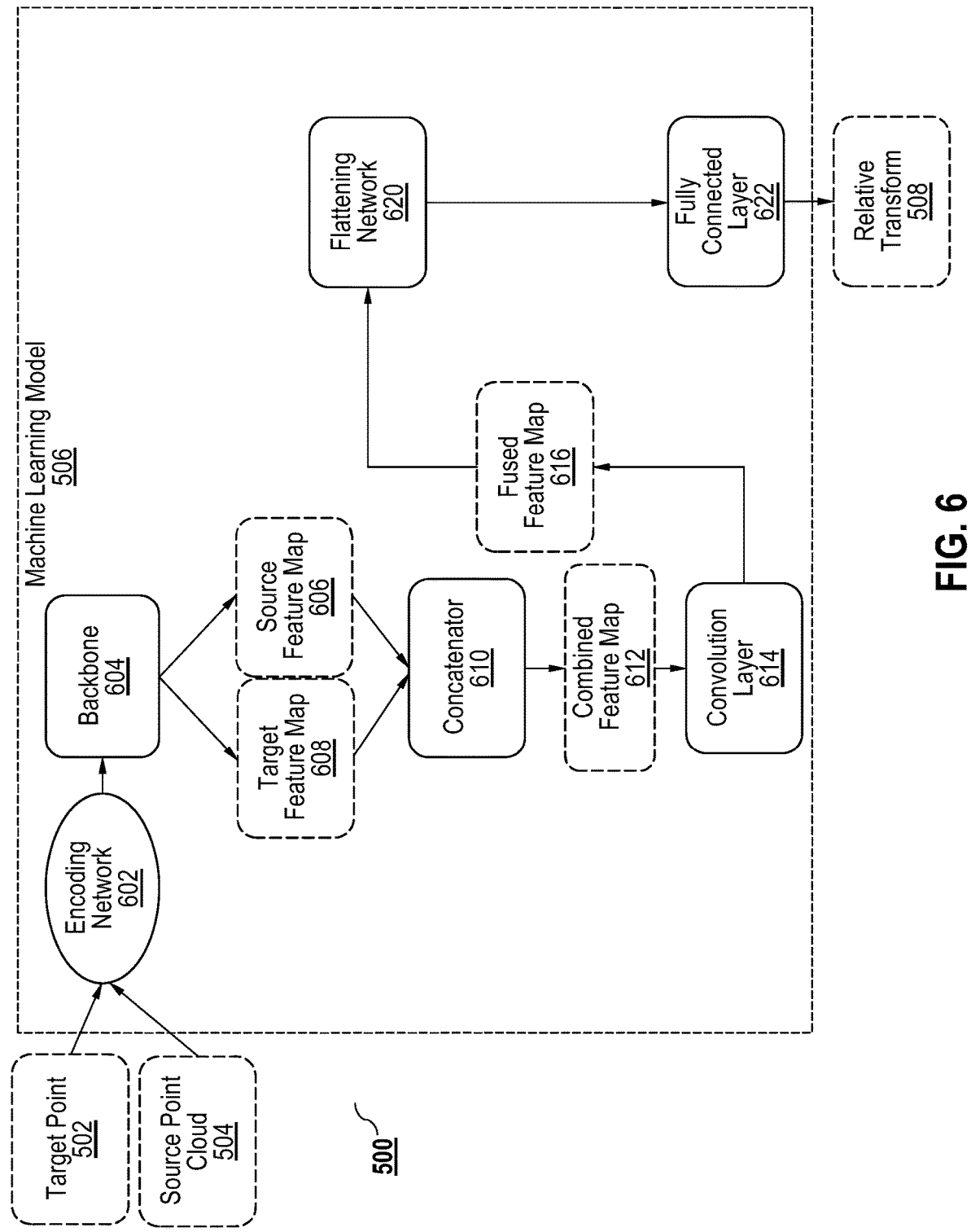
FIG. 6 depicts a system performing an implementation of a process for determining a trajectory of a vehicle within a physical space using the machine learning model that determines a relative transform between point clouds.

FIG. 6 depicts the system 500 performing an implementation of a process for determining a trajectory of a vehicle within a physical space using the machine learning model 506, according to some embodiments of the current subject matter described and illustrated herein. In particular, FIG. 6 depicts in detail, the components associated with and the steps implemented by the machine learning model 506 to determine a relative transform for aligning the target point cloud 502 to the source point cloud 504. As stated above, such an alignment enables for the generation of an aligned point cloud, in addition to accurate and reliable high definition maps that may be utilized by the autonomous vehicle computer 400 to determine a trajectory of the vehicle within the physical space, e.g., for navigating at least a portion of a street, a highway, a city block, a city intersection, etc.

In embodiments, as part of the application of the machine learning model 506, each of the target point cloud 502 and the source point cloud 504 may be received as inputs by the machine learning model 506. As stated, each of the target point cloud 502 and the source point cloud 504 may be captured by LiDAR sensors 202b of the vehicle and may represent different perspective views of at least a part of the same physical space, e.g., the same city block, city-street, pedestrian, etc. The received point clouds may be input into an encoding network 602. In some embodiments, the encoding network 602 encodes each of the target point cloud 502 and the source point cloud 504 such that one or more objects present in each of the target point cloud 502 and the source point cloud 504 are represented as one or more pillars. Each of the one or more pillars serve to bound a plurality of points associated with a corresponding object. For example, the encoding network 602 may receive each of the target point cloud 502 and the source point cloud 504 as inputs and predict three-dimensional boxes (e.g., "pillars") for various types and classes of objects present in the physical space and which are represented by the point clouds. For example, cars, pedestrians, cyclists, traffic lights, road signs, buildings, and/or the like. The encoding network 602, as part of the encoding of the point clouds, prepares each of the target point cloud 502 and the source point cloud 504 for feature extraction.

In some embodiments, such an encoding network (e.g., the encoding network 602) may correspond to a pillar feature encoder network, and may operate in conjunction with a convolutional backbone, and a detection head (not shown). For example, a pillar feature encoder network may correspond to the encoding network 602 and operate to convert a point cloud into a sparse pseudo-image. Thereafter, the sparse pseudo-image may be input into a two-dimensional convolutional backbone that processes the pseudo-image into a high level representation of the image. Finally, the detection head may detect and regress three dimensional boxes.

In some embodiments, the encoding network 602 in the form of a pillar feature encoder network may convert a particular point cloud (e.g., the target point cloud 502 and the source point cloud 504) into a pseudo-image in the form of a two-dimensional image embedding (tensor) with more than three channels. Thereafter, as a non-limiting example, each of the point clouds may be discretized into evenly spaced grids relative to a particular plane, e.g., x-y plane, in order to create a set of pillars. The various points in each pillar of the set of pillars may be augmented with $x_c$, $y_c$, $z_c$, $x_p$ and $y_p$, where subscript c denotes a distance value relative to the arithmetic mean of all points in the pillar and subscript p denotes the offset from the center coordinate of the pillar. It is noted that the augmented LiDAR point has nine dimensions. Additionally, in some embodiments, a linear layer is applied to each of the augmented points in the pillar to generate a tensor of a particular size (C, P, N). Further, a max operation may be performed over the channels to generate an output tensor of size (C, P). In this way, the encoding network 602 may encode each of the target point cloud 502 and the source point cloud 504 such that one or more objects present in each point cloud may be represented as one or more pillars that bound a plurality of points associated with various objects in the physical space, e.g., cars, pedestrians, cyclists, traffic lights, road signs, buildings, and/or the like.

In some embodiments, the backbone 604 may include two sub-networks. A first sub-network may be a top-down network that produces features at an increasingly small spatial resolution and a second network may perform up-sampling and concatenation of the top-down features. For example, the top-down network may be characterized by a series of blocks with each block operating at a particular stride, which may be measured relative to the original input pseudo-image. Each block may have a particular number of two-dimensional convolution layers (e.g., 3×3 two-dimensional convolution layers) with a particular number of output channels, each followed by BatchNorm and a ReLU. The final features from each top-down block may be combined through up-sampling and concatenation. In particular, a set of features are up-sampled using a transposed two-dimensional convolution with a number of final features, subsequent to which BatchNorm and ReLU may be applied to the up-sampled features. The final features may be a concatenation of all features that originated from different strides. Non-limiting examples of the backbone 604 may include ResNet, VGG, and/or the like.

Referring to FIG. 6, the outputs of the backbone 604, upon completion of one or more of the processes described above, are two distinct feature maps—a source feature map 606 and a target feature map 608. The source feature map 606 corresponds to an encoded representation of the source point cloud 504 and the target feature map corresponds to the encoded representation of the target point cloud 502. Thereafter, the concatenator 610 receives the source feature map 606 and the target feature map 608 as inputs and outputs a combined feature map 612. In some embodiments, the combined feature map 612 may be the result of a stacking operation in which the target feature map 608 may be positioned directly onto the source feature map 606, e.g., independent of any calculations or computations. In embodiments, a result of such a stacking operation may be that the length and width values of each of the features maps is retained, while the height value is equivalent to a combined value of the heights of each of the feature maps. Thereafter, the combined feature map 612 may be input into a convolution layer 614, which outputs a fused feature map 616, e.g., as a result of a 1×1 convolution. For example, as part of the application of the machine learning model 506, the convolution layer may perform a weighted sampling on the combined feature map 612 to generate the fused feature map 616.

Still referring to FIG. 6, the fused feature map 616 may be input into a flattening network 620. For example, the fused feature map 616 may be in a three-dimensional format and the flattening network 620, upon receiving the fused feature map 616, may transform or represent the values in the three-dimensional format as a one dimensional vector (e.g., a one-dimensional vector array of values), as this format may be suitable for processing by other parts of the machine learning model 506. For example, as part of the conversion of the fused feature map 616 into a one dimensional vector, the flattening network 620 may list each feature of the fused feature map 616 in the three-dimensional format as part of an array such that length, width, and height values of the fused feature map 616 (corresponding to values on different dimensions, e.g., the x-axis, y-axis, and z-axis) may be represented as part of a single one-dimensional vector array of values (e.g., x-value, y-value, z-value, etc.). The one-dimensional vector may be input into a fully connected layer 622, which may only receive inputs in a one-dimensional vector format.

In operation, the fully connected layer may receive the fused feature map 616 as converted into a one-dimensional vector format, and output a relative transform 508. For example, the relative transform that is outputted by the fully connected layer 622 may be represented in the form of a seven dimensional vector such that three values of the seven dimensional vector correspond to a translation along at least one of an x-axis, a y-axis, and a z-axis, and four values of the vector correspond to a rotational movement around a fixed point of θ radians about a unit axis (X, Y, Z).

Figure 7:
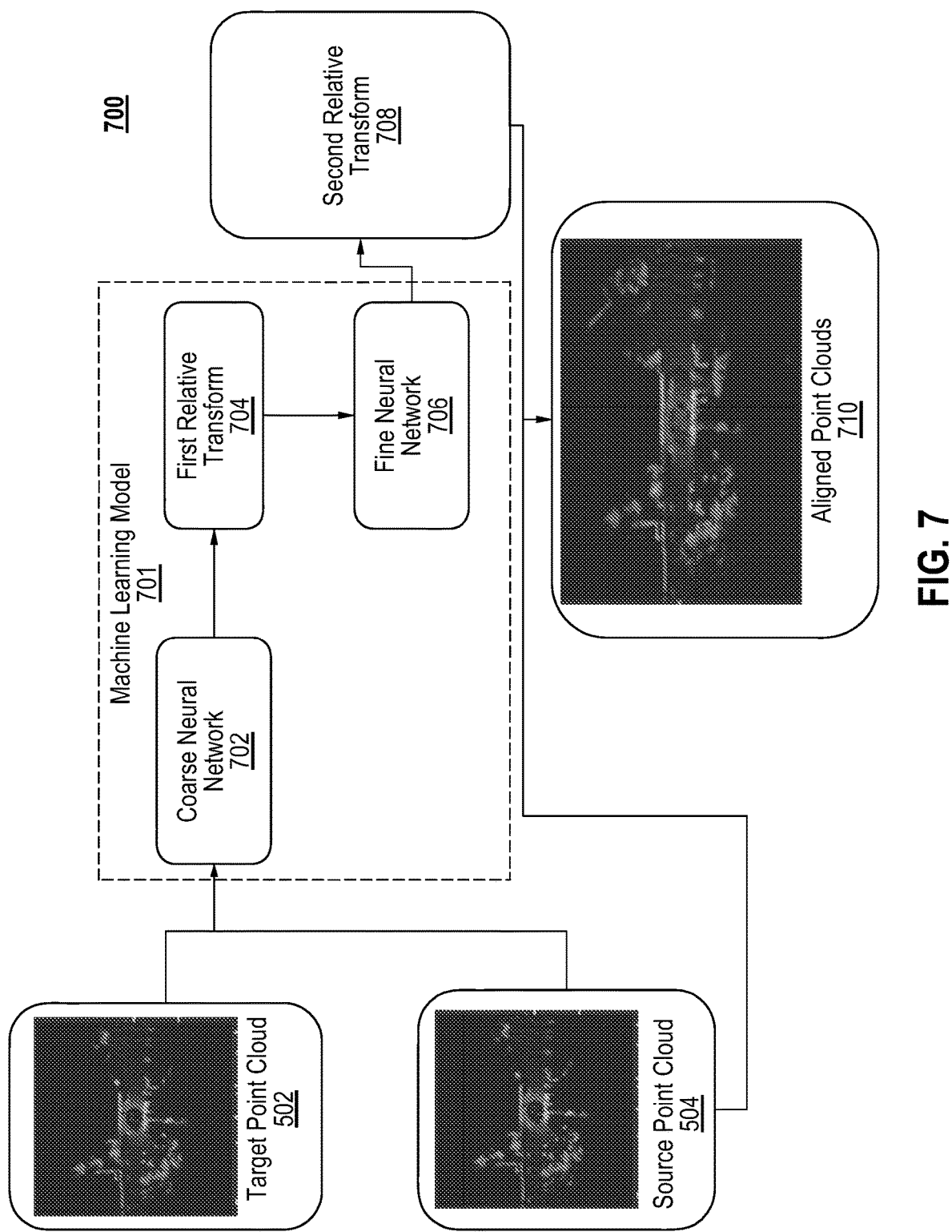
FIG. 7 depicts the system performing an implementation of another process for determining a trajectory of a vehicle within a physical space using the machine learning model that determines multiple relative transforms between point clouds.

FIG. 7 depicts the system 700 performing an implementation of another process for determining a trajectory of a vehicle within a physical space using the machine learning model 701, according to some embodiments of the current subject matter described and illustrated herein. In particular, FIG. 7 depicts an implementation of a process in which the machine learning model 701 includes a coarse neural network 702 and a fine neural network 706. The machine learning model 701 may receive the target point cloud 501 and the source point cloud 504 as separate inputs. Further, it is noted that the operation of the coarse neural network 702 is substantially similar to the operation of the machine learning model 506 as illustrated in FIG. 6 and described in detail above, and as such, the output of the coarse neural network 702 (e.g., the machine learning model 506) is a first relative transform 704 that may be comparable to the relative transform 508. The first relative transform 704 may be utilized to align the target point cloud 502 to the source point cloud 504 to a particular extent. In embodiments, such a preliminary alignment may be considered a coarse point registration of the target point cloud 502 to the source point cloud 504. Further alignment of the target point cloud 502 to the source point cloud 504 may be possible and would likely improve the likelihood of the generation of accurate and reliable high definition maps, which in turn enables safe operation and navigation of the vehicle.

Returning to FIG. 7, upon determination of the first relative transform 704, the machine learning model 701 may be applied to the first relative transform 704 in order to determine a second relative transform. The second relative transform may be utilized to further align the target point cloud 502 that is aligned to the source point cloud 504. Such further alignment corresponds to a fine point registration of the target point cloud 502 relative to the source point cloud 504, e.g., within the coordinate system of the source point cloud 504. In this way, the machine learning model 701 may be utilized to generate aligned point clouds 710 as illustrated in FIG. 7.

Figure 8A:
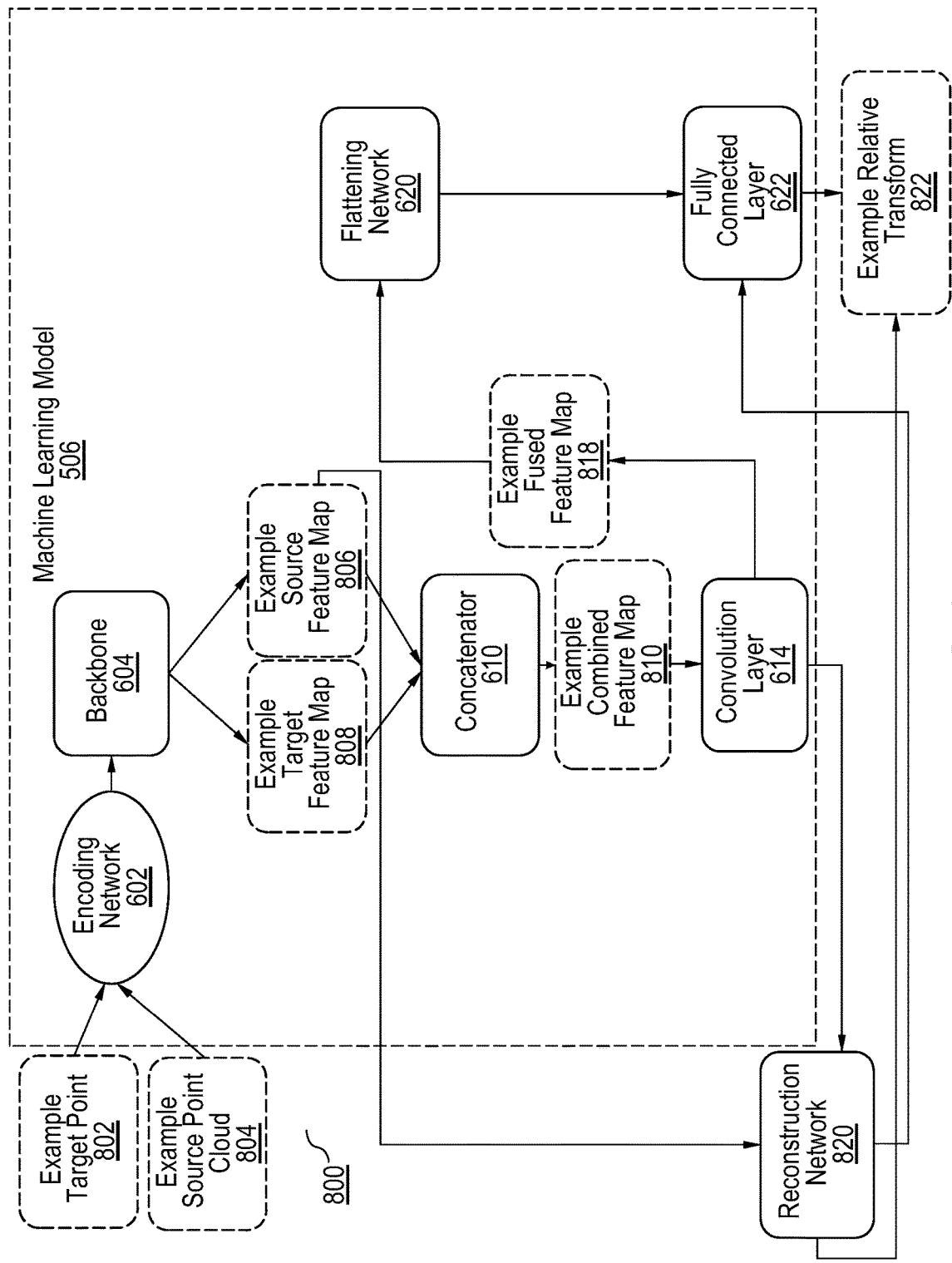
FIG. 8A depicts the system performing an implementation of another process for determining a trajectory of a vehicle within a physical space using the machine learning model that is pre-trained to determine a relative transform.

FIG. 8A depicts the system 800 performing an implementation of a process to pre-train the machine learning model 506, according to some embodiments of the current subject matter described and illustrated herein. In particular, FIG. 8A depicts the components associated with and the steps implemented to pre-train the machine learning model 506 for the purpose of determining a relative transform 508 for aligning the target point cloud 502 to the source point cloud 504. Doing so may improve the performance of the subsequently trained machine learning model 506 in particular when it comes to determining the correct relative transform 508 when the misalignment between the source point cloud 504 and the target point cloud 502 is large (e.g., large translations, rotations, and/or the like). As illustrated in FIG. 8A, pre-training of the machine learning model 506 includes the use of a reconstruction network 820, which is illustrated in detail in FIG. 8B and further described below.

Referring to FIG. 8A, an example target point cloud 802 and an example source point cloud 804, obtained from training data utilized to train the machine learning model 506 to determine a first relative transform for aligning the target point cloud 502 to the source point cloud 504, may be input into the encoding network 602 that encodes each of the example source point cloud 804 and the example target point cloud 802 and a backbone 604 that processes each encoded example source point cloud 804 and the example target point cloud 802 to generate an example source feature map 806 and an example target feature map 808. Thereafter, the concatenator 610 may generate an example combined feature map 810 by stacking the example target feature map 808 directly onto the example source feature map 806, e.g., independent of performing any calculations, a result of which may be that the length and width values of each of the features maps is retained, while the height value is equivalent to a combined value of the individual heights of the feature maps. Thereafter, the example combined feature map 810 may be input into a convolution layer 614, which in turn outputs an example fused feature map 818 as a result of a 1×1 convolution operation. For example, the convolution layer 614 may perform a weighted subsampling on the example combined feature map 810 in order to generate an example fused feature map 818.

In embodiments, the example fused feature map 616 may be input into a flattening network 620 that may transform or represent the feature values of the example fused feature map 818 as a one dimensional vector, e.g., the flattening network 620 may list each feature of the example fused feature map 818 as part of an array such that length, width, and height values of the example fused feature map 818 (corresponding to values on different dimensions, e.g., the x-axis, y-axis, and z-axis) may be represented as part of a one-dimensional vector array of values (e.g., x-value, y-value, z-value, etc.). The one-dimensional vector may then be input into the fully connected layer 622 that outputs an example relative transform 822 in the form of a seven-dimensional vector. However, it is noted that the determination of the example relative transform 822 includes the use of the reconstruction network 820, which receives the example target feature map 808 and the example fused feature map 818 and may feed offsets data to the fully connected layer 622.

Figure 8B:
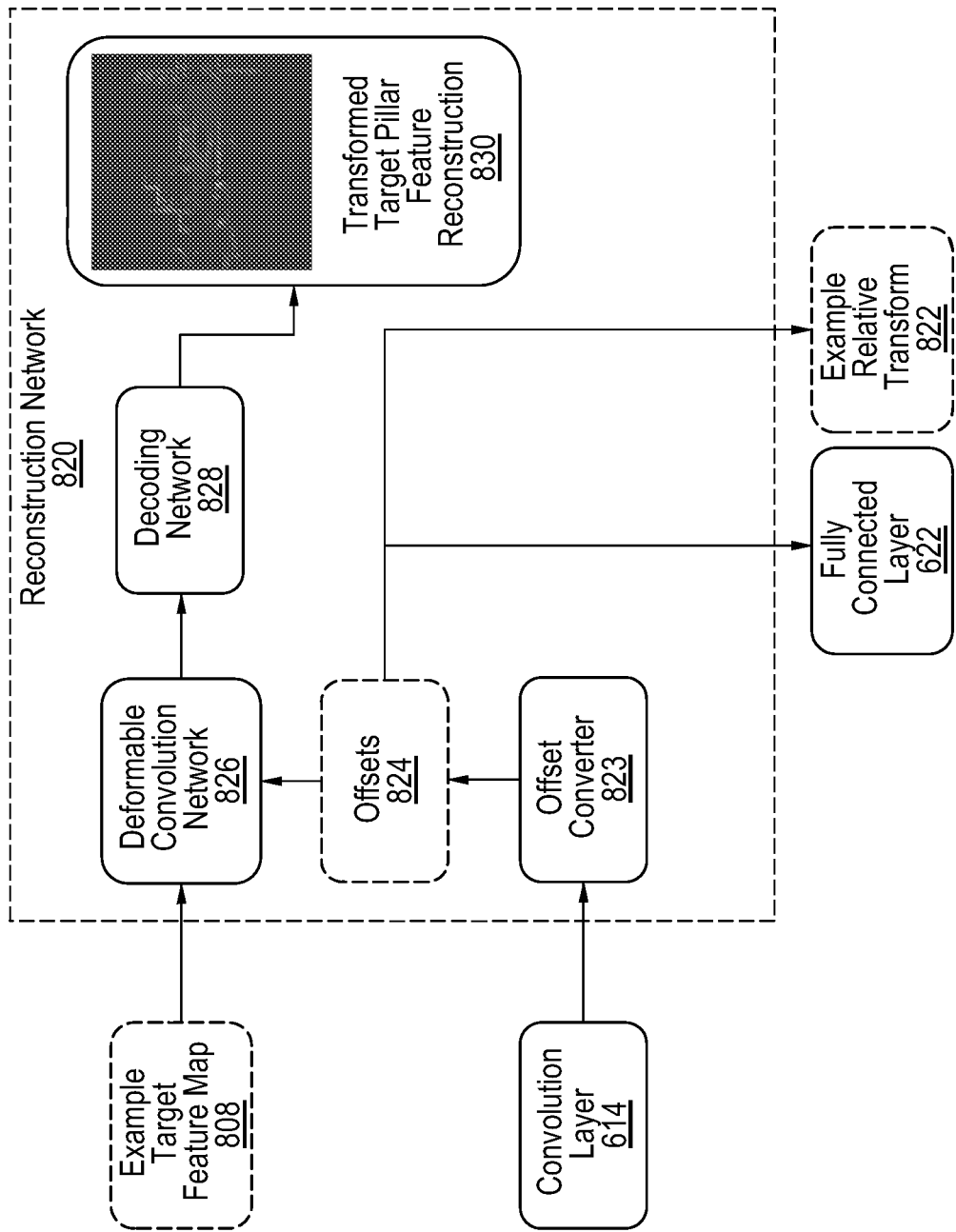
FIG. 8B illustrates a block diagram detailing the components and steps included as part of the operation of the reconstruction network for pre-training the machine learning model to determine a relative transform.

FIG. 8B illustrates a block diagram detailing the components and steps included as part of the operation of the reconstruction network 820 for pre-training the machine learning model 506 to generate a relative transform in order to align the example target point cloud 802 with the source point cloud 804. In some embodiments, the reconstruction network 820 includes an offset converter 823, a deformable convolution network 826, and a decoding network 828. During pre-training of the machine learning model 506, prior to completing the training of the machine learning model 506 to determine the first relative transform 704, the machine learning model 506 may operate to reconstruct a point cloud, using point cloud training data.

In pre-training, the example target feature map 808 may be input into the deformable convolution network 826 and example fused feature map 818 may be input into the offset converter 823. The offset converter 823 may receive the example fused feature map 818 and generate offsets 824 that are fed into the deformable convolution network 826. The deformable convolution network 826 applies the received offsets 824 to the example target feature map 808 to deform the example target feature map 808, which is generated from an encoded example target point cloud 802. The output of the deformable convolution network 826 (the example target feature map 808 that is deformed based on the applied offsets 824) is input into the decoding network 828, which decodes the deformed example target feature map 808 (based on the example target point cloud 802). It is noted that the offsets may be utilized to adjust the operation of the machine learning model 506, namely to minimize a difference between the example target feature map 808 that is deformed based on the applied offsets 824 (based on the example target point cloud 802) and the decoded example target feature map 808 (associated with the decoded example target point cloud 802) that is deformed based on the applied offsets 824. It is further noted that an encoder may be pre-trained based at least on the difference between the point cloud (e.g., the example target point cloud 802) and the point cloud (e.g., the example target point cloud 802) that is decoded.

Figure 9:
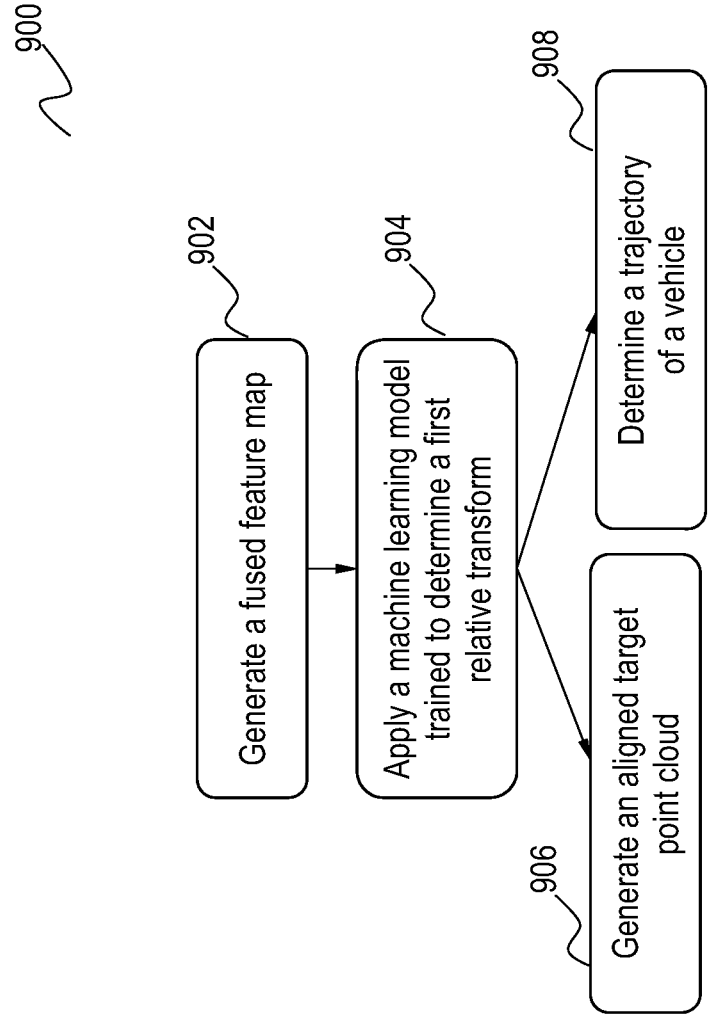
FIG. 9 depicts a flowchart illustrating an example of a process for determining a trajectory of a vehicle within a physical space using the machine learning model that determines one or more relative transforms between point clouds.

FIG. 9 depicts a flowchart illustrating an example of a process 900 for determining a trajectory of a vehicle (e.g., an autonomous vehicle) based on a relative transform that further aligns the target point cloud. In some embodiments, one or more of the operations described with respect to the process 900 are performed (e.g., completely, partially, and/or the like) by the perception system 402, the planning system 404, and/or the control system 408 of the autonomous vehicle computer 400 of the vehicle, one or more of which can apply the machine learning model 506 trained to determine a first relative transform, which may be utilized for aligning the target point cloud 502 with the source point cloud 504 and determining a trajectory of a vehicle, as described above. Additionally, or alternatively, in some embodiments, one or more steps described with respect to the process 900 are performed (e.g., completely, partially, and/or the like) by another device or group of devices separate from or including the autonomous vehicle computer 400.

At 902, a fused feature map may be generated from multiple feature maps. For example, a fused feature map may be generated by concatenating a first feature map corresponding to a source point cloud and a second feature map corresponding to a target point cloud. In embodiments, the target point cloud may represent at least a portion of a same physical space as the source point cloud. For example, the target point cloud may represent a physical space in the form of a city block on which a street intersection, a traffic light, a stop sign, a pedestrian, multiple buildings, etc., may be located. As a non-limiting example, the target point cloud may represent a physical space from a particular direction, e.g., west, while the source point cloud may represent the same physical space (the city block) from another direction, e.g., north. The first feature map corresponds to an encoded representation of the source point cloud and the second feature map corresponds to an encoded representation of the target point cloud. As part of the encoding process, one or more objects included as part of the source point cloud and the target point cloud, e.g., one or more objects in the form of the traffic light, the stop sign, the pedestrian, the multiple buildings, etc., may be represented as one or more pillars, which serve as a boundary around a plurality of points associated with a particular object. For example, one or more pillars may serve as a boundary around a subset of a plurality of points associated with, e.g., the pedestrian, while another set of one or more pillars may serve as a boundary around another subset of a plurality of points associated with, e.g., the stop sign.

At 904, a machine learning model may be applied to determine a first relative transform aligning the target point cloud to the source point cloud. For example, a machine learning model (e.g., the machine learning model 506) may be applied to determine a first relative transform that may be utilized to align the target point cloud within the coordinate system of the source point cloud. For example, the first relative transform of the target point cloud may include a translation along at least one of an x-axis, a y-axis, or a z-axis. Alternatively, or additionally, the first relative transform may include a rotation around a fixed point of θ radians about a unit axis, e.g., the x-axis, the y-axis, or the z-axis. In operation, a machine learning model (e.g., the machine learning model 506) may perform a weighted subsampling with the use of a convolution layer that is included as part of the machine learning model. The weighted subsampling enables extraction, from the fused feature map, of corresponding features from the source point cloud and the target point cloud such that the first feature map and the second feature map are downsampled into a combined feature map. Further, the combined feature map may be flattened into a one-dimensional vector for processing by a fully connected layer of the machine learning model. In embodiments, the output of the fully connected layer is the first transform, which is utilized to perform a coarse point registration of the target point cloud. For example, the first transform can be represented as a seven dimensional vector in which three of the elements correspond to a translation along at least one of the x-axis, the y-axis, and the z-axis, while four of the elements correspond to a rotation around a fixed point of θ radians about a unit axis, e.g., the x-axis, the y-axis, or the z-axis.

At 906, an aligned point cloud may be generated by at least transforming the target point cloud in accordance with the first relative transform. For example, the transforming of the target point cloud may include a translation of the target point cloud along at least one of an x-axis, a y-axis, or a z-axis, and/or a rotation of the target point cloud around a fixed point. Additionally, a machine learning model (e.g., the machine learning model 506) may be applied to determine a second relative transform in order to further align the aligned target point cloud to the source point cloud. In particular, the further alignment of the target point cloud based on the second relative transform is a fine point registration of the target point cloud relative to the source point cloud, e.g., within the coordinate system of the source point cloud.

At 908, a trajectory of a vehicle within the physical space may be determined based on the relative transform that further aligns the target point cloud. For example, a path along which a vehicle (e.g., vehicle 102 shown in FIG. 1, vehicle 200 shown in FIG. 2, etc.) may travel in order to navigate within the physical space (e.g., the city block in which a street intersection, a traffic light, a stop sign, a pedestrian, and multiple buildings may be located) such that the vehicle accurately travels from one or more source locations to one or more destination locations, e.g., while avoiding collisions with other vehicles, pedestrians, buildings, and/or the like.

According to some non-limiting embodiments or examples, provided is a method, comprising: generating, using at least one data processor, a fused feature map by at least concatenating a first feature map corresponding to a source point cloud and a second feature map corresponding to a target point cloud, the target point cloud corresponding to at least a portion of a same physical space as the source point cloud; applying, using the at least one data processor, a machine learning model trained to determine, based at least on the fused feature map, a first relative transform aligning the target point cloud to the source point cloud; generating, using the at least one data processor, an aligned target point cloud by at least transforming the target point cloud in accordance with the first relative transform; and determining, using the at least one data processor, a trajectory of a vehicle within the physical space based on at least the first relative transform.

According to some non-limiting embodiments or examples, provided is a system, comprising: at least one processor, and at least one non-transitory storage media storing instructions that, when executed by the at least one processor, cause the at least one processor to perform operations comprising: generating, using the at least one data processor, a fused feature map by at least concatenating a first feature map corresponding to a source point cloud and a second feature map corresponding to a target point cloud, the target point cloud corresponding to at least a portion of a same physical space as the source point cloud; applying, using the at least one data processor, a machine learning model trained to determine, based at least on the fused feature map, a first relative transform aligning the target point cloud to the source point cloud; generating, using the at least one data processor, an aligned target point cloud by at least transforming the target point cloud in accordance with the first relative transform; and determining, using the at least one data processor, a trajectory of a vehicle within the physical space based on at least the first relative transform.

According to some non-limiting embodiments or examples, provided is at least one non-transitory computer-readable medium comprising one or more instructions that, when executed by at least one processor, cause the at least one processor to perform operations comprising: generating, using the at least one data processor, a fused feature map by at least concatenating a first feature map corresponding to a source point cloud and a second feature map corresponding to a target point cloud, the target point cloud corresponding to at least a portion of a same physical space as the source point cloud; applying, using the at least one data processor, a machine learning model trained to determine, based at least on the fused feature map, a first relative transform aligning the target point cloud to the source point cloud; generating, using the at least one data processor, an aligned target point cloud by at least transforming the target point cloud in accordance with the first relative transform; and determining, using the at least one data processor, a trajectory of a vehicle within the physical space based on at least the first relative transform.

Further non-limiting aspects or embodiments are set forth in the following numbered clauses:

Clause 1: A method, comprising: generating, using at least one data processor, a fused feature map by at least concatenating a first feature map corresponding to a source point cloud and a second feature map corresponding to a target point cloud, the target point cloud corresponding to at least a portion of a same physical space as the source point cloud; applying, using the at least one data processor, a machine learning model trained to determine, based at least on the fused feature map, a first relative transform aligning the target point cloud to the source point cloud; generating, using the at least one data processor, an aligned target point cloud by at least transforming the target point cloud in accordance with the first relative transform; and determining, using the at least one data processor, a trajectory of a vehicle within the physical space based on at least the first transform.

Clause 2: The method of clause 1, wherein the first feature map corresponds to an encoded representation of the source point cloud, and wherein the second feature map corresponds to an encoded representation of the target point cloud.

Clause 3: The method of clause 2, further comprising: encoding, using the at least one data processor, the source point cloud and the target point cloud such that one or more objects present in each point cloud are represented as one or more pillars, each of the one or more pillars bounding a plurality of points associated with a corresponding object.

Clause 4: The method of any of clauses 1 to 3, further comprising: pre-training, using the at least one data processor, the machine learning model prior to training the machine learning model to determine the first relative transform, the pre-training includes reconstructing, using the at least one data processor, a point cloud by at least decoding an encoding of the point cloud deformed by one or more offsets determined by the machine learning model, and adjusting the machine learning model to minimize a difference between the point cloud and the decoded point cloud.

Clause 5: The method of any of clause 4, further comprising: pre-training, based at least on the difference between the point cloud and the decoded point cloud, an encoder generating the encoding of the point cloud.

Clause 6: The method of any of clauses 1 to 5, wherein the machine learning model determines the first relative transform by at least performing a weighted subsampling to extract, from the fused feature map, corresponding features from the source point cloud and the target point cloud such that the first feature map and the second feature map are downsampled into a combined feature map.

Clause 7: The method of clause 6, wherein the machine learning model includes a 1×1 convolution layer configured to perform the weighted subsampling.

Clause 8: The method of any of clauses 6 to 7, wherein the machine learning model further determines the first relative transform by at least flattening the combined feature map into a one-dimensional vector for processing by a fully connected layer of the machine learning model.

Clause 9: The method of any of clauses 1 to 8, further comprising: applying, using the at least one data processor, the first relative transform to perform a coarse point registration of the target point cloud, applying, using the at least one data processor, the machine learning model trained to determine a second relative transform to further align the aligned target point cloud to the source point cloud, and applying, using the at least one data processor, the second relative transform to perform a fine point registration of the target point cloud.

Clause 10: The method of any of clauses 1 to 9, wherein the first relative transform includes a translation along at least one of an x-axis, a y-axis, and a z-axis.

Clause 11: The method of any of clauses 1 to 10, wherein the first relative transform includes a rotation around a fixed point of θ radians about a unit axis (X, Y, Z).

Clause 12: The method of any of clauses 1 to 11, wherein the source point cloud and the target point cloud comprise three dimensional point clouds.

Clause 13: A system, comprising: at least one processor, and at least one non-transitory storage media storing instructions that, when executed by the at least one processor, cause the at least one processor to perform operations comprising: generating, using the at least one data processor, a fused feature map by at least concatenating a first feature map corresponding to a source point cloud and a second feature map corresponding to a target point cloud, the target point cloud corresponding to at least a portion of a same physical space as the source point cloud; applying, using the at least one data processor, a machine learning model trained to determine, based at least on the fused feature map, a first relative transform aligning the target point cloud to the source point cloud; generating, using the at least one data processor, an aligned target point cloud by at least transforming the target point cloud in accordance with the first relative transform; and determining, using the at least one data processor, a trajectory of a vehicle within the physical space based on at least on the first relative transform.

Clause 14: The system of clause 13, wherein the first feature map corresponds to an encoded representation of the source point cloud, and wherein the second feature map corresponds to an encoded representation of the target point cloud.

Clause 15: The system of clause 14, wherein the operations further comprise: encoding, using the at least one data processor, the source point cloud and the target point cloud such that one or more objects present in each point cloud are represented as one or more pillars, each of the one or more pillars bounding a plurality of points associated with a corresponding object.

Clause 16: The system of any of clauses 13 to 15, wherein the operations further comprise: pre-training, using the at least one data processor, the machine learning model prior to training the machine learning model to determine the first relative transform, the pre-training includes reconstructing, using the at least one data processor, a point cloud by at least decoding an encoding of the point cloud deformed by one or more offsets determined by the machine learning model, and adjusting the machine learning model to minimize a difference between the point cloud and the decoded point cloud.

Clause 17: The system of clause 16, wherein the operations further comprise: pre-training, based at least on the difference between the point cloud and the decoded point cloud, an encoder generating the encoding of the point cloud.

Clause 18: The system of any of clauses 13 to 17, wherein the machine learning model determines the first relative transform by at least performing a weighted subsampling to extract, from the fused feature map, corresponding features from the source point cloud and the target point cloud such that the first feature map and the second feature map are downsampled into a combined feature map.

Clause 19: The system of clause 18, wherein the machine learning model includes a 1×1 convolution layer configured to perform the weighted subsampling.

Clause 20: The system of any of clauses 18 to 19, wherein the machine learning model further determines the first relative transform by at least flattening the combined feature map into a one-dimensional vector for processing by a fully connected layer of the machine learning model.

Clause 21: The system of any of clauses 13 to 20, wherein the operations further comprise: applying, using the at least one data processor, the first relative transform to perform a coarse point registration of the target point cloud; applying, using the at least one data processor, the machine learning model trained to determine a second relative transform to further align the aligned target point cloud to the source point cloud; and applying, using the at least one data processor, the second relative transform to perform a fine point registration of the target point cloud.

Clause 22: The system of any of clauses 13 to 21, wherein the first relative transform includes a translation along at least one of an x-axis, a y-axis, and a z-axis.

Clause 23: The system of any of clauses 13 to 22, wherein the first relative transform includes a rotation around a fixed point of θ radians about a unit axis (X, Y, Z).

Clause 24: the system of any of clauses 13 to 23, wherein the source point cloud and the target point cloud comprise three dimensional point clouds.

Clause 25: At least one non-transitory storage media storing instructions that, when executed by at least one processor, cause the at least one processor to: generating, using the at least one data processor, a fused feature map by at least concatenating a first feature map corresponding to a source point cloud and a second feature map corresponding to a target point cloud, the target point cloud corresponding to at least a portion of a same physical space as the source point cloud; applying, using the at least one data processor, a machine learning model trained to determine, based at least on the fused feature map, a first relative transform aligning the target point cloud to the source point cloud; generating, using the at least one data processor, an aligned target point cloud by at least transforming the target point cloud in accordance with the first relative transform; and determining, using the at least one data processor, a trajectory of a vehicle within the physical space based on at least the first relative transform.

Clause 26: The at least one non-transitory storage media of clause 25, wherein the first feature map corresponds to an encoded representation of the source point cloud, and wherein the second feature map corresponds to an encoded representation of the target point cloud.

Clause 27: The at least one non-transitory storage media of clause 26, wherein the operations further comprise: encoding, using the at least one data processor, the source point cloud and the target point cloud such that one or more objects present in each point cloud are represented as one or more pillars, each of the one or more pillars bounding a plurality of points associated with a corresponding object.

Clause 28: The at least one non-transitory storage media of any of clauses 25 to 27, wherein the operations further comprise: pre-training, using the at least one data processor, the machine learning model prior to training the machine learning model to determine the first relative transform, the pre-training including reconstructing, using the at least one data processor, a point cloud by at least decoding an encoding of the point cloud deformed by one or more offsets determined by the machine learning model, and adjusting the machine learning model to minimize a difference between the point cloud and the decoded point cloud; and pre-training, based at least on the difference between the point cloud and the decoded point cloud, an encoder generating the encoding of the point cloud.

Clause 29: The at least one non-transitory storage media of any of clauses 25 to 28, wherein the machine learning model determines the first relative transform by at least performing a weighted subsampling to extract, from the fused feature map, corresponding features from the source point cloud and the target point cloud such that the first feature map and the second feature map are downsampled into a combined feature map.

Clause 30: The at least one non-transitory storage media of clause 29, wherein the machine learning model includes a 1×1 convolution layer configured to perform the weighted subsampling.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    generating, using at least one data processor, a fused feature map by at least concatenating a first feature map corresponding to a source point cloud and a second feature map corresponding to a target point cloud, the target point cloud corresponding to at least a portion of a same physical space as the source point cloud;
    applying, using the at least one data processor, a machine learning model trained to determine, based at least on the fused feature map, a first relative transform aligning the target point cloud to the source point cloud, wherein the first relative transform is used to obtain a coarse point registration of the target point cloud;
    generating, using the at least one data processor, an aligned target point cloud by at least transforming the target point cloud in accordance with the first relative transform;
    applying, using the at least one data processor, the machine learning model trained to determine a second relative transform to further align the aligned target point cloud to the source point cloud, wherein the second relative transform is used to obtain a fine point registration of the target point cloud; and
    determining, using the at least one data processor, a trajectory of a vehicle within the physical space based on at least the fine point registration of the target point cloud.

2. The method of claim 1, wherein the first feature map corresponds to an encoded representation of the source point cloud, and wherein the second feature map corresponds to an encoded representation of the target point cloud.

3. The method of claim 2, further comprising:
    encoding, using the at least one data processor, the source point cloud and the target point cloud such that one or more objects present in each point cloud are represented as one or more pillars, each of the one or more pillars bounding a plurality of points associated with a corresponding object.

4. The method of claim 1, further comprising:
    pre-training, using the at least one data processor, the machine learning model prior to training the machine learning model to determine the first relative transform, the pre-training includes reconstructing, using the at least one data processor, a point cloud by at least decoding an encoding of the point cloud deformed by one or more offsets determined by the machine learning model, and adjusting the machine learning model to minimize a difference between the point cloud and the decoded point cloud.

5. The method of claim 4, further comprising:
    pre-training, based at least on the difference between the point cloud and the decoded point cloud, an encoder generating the encoding of the point cloud.

6. The method of claim 1, wherein the machine learning model determines the first relative transform by at least performing a weighted subsampling to extract, from the fused feature map, corresponding features from the source point cloud and the target point cloud such that the first feature map and the second feature map are downsampled into a combined feature map.

7. The method of claim 6, wherein the machine learning model includes a 1×1 convolution layer configured to perform the weighted subsampling.

8. The method of claim 6, wherein the machine learning model further determines the first relative transform by at least flattening the combined feature map into a one-dimensional vector for processing by a fully connected layer of the machine learning model.

9. The method of claim 1, wherein the first relative transform includes a translation along at least one of an x-axis, a y-axis, and a z-axis.

10. The method of claim 1, wherein the first relative transform includes a rotation around a fixed point of $\theta$ radians about a unit axis (X, Y, Z).

11. The method of claim 1, wherein the source point cloud and the target point cloud comprise three dimensional point clouds.

12. A system, comprising:
    at least one processor, and
    at least one non-transitory storage media storing instructions that, when executed by the at least one processor, cause the at least one processor to perform operations comprising:
    generating a fused feature map by at least concatenating a first feature map corresponding to a source point cloud and a second feature map corresponding to a target point cloud, the target point cloud corresponding to at least a portion of a same physical space as the source point cloud;
    applying a machine learning model trained to determine, based at least on the fused feature map, a first relative transform aligning the target point cloud to the source point cloud, wherein the first relative transform is used to obtain a coarse point registration of the target point cloud;

generating an aligned target point cloud by at least transforming the target point cloud in accordance with the first relative transform;

applying the machine learning model trained to determine a second relative transform to further align the aligned target point cloud to the source point cloud, wherein the second relative transform is used to obtain a fine point registration of the target point cloud; and determining a trajectory of a vehicle within the physical space based on at least the fine point registration of the target point cloud.

13. The system of claim 12, wherein the first feature map corresponds to an encoded representation of the source point cloud, and wherein the second feature map corresponds to an encoded representation of the target point cloud.

14. The system of claim 13, wherein the operations further comprise:

encoding the source point cloud and the target point cloud such that one or more objects present in each point cloud are represented as one or more pillars, each of the one or more pillars bounding a plurality of points associated with a corresponding object.

15. The system of claim 12, wherein the operations further comprise:

pre-training the machine learning model prior to training the machine learning model to determine the first relative transform, the pre-training includes reconstructing a point cloud by at least decoding an encoding of the point cloud deformed by one or more offsets determined by the machine learning model, and adjusting the machine learning model to minimize a difference between the point cloud and the decoded point cloud.

16. The system of claim 15, wherein the operations further comprise:

pre-training, based at least on the difference between the point cloud and the decoded point cloud, an encoder generating the encoding of the point cloud.

17. The system of claim 12, wherein the machine learning model determines the first relative transform by at least performing a weighted subsampling to extract, from the fused feature map, corresponding features from the source point cloud and the target point cloud such that the first feature map and the second feature map are downsampled into a combined feature map.

18. The system of claim 17, wherein the machine learning model includes a 1×1 convolution layer configured to perform the weighted subsampling.

19. The system of claim 17, wherein the machine learning model further determines the first relative transform by at least flattening the combined feature map into a one-dimensional vector for processing by a fully connected layer of the machine learning model.

20. The system of claim 12, wherein the first relative transform includes a translation along at least one of an x-axis, a y-axis, and a z-axis.

21. The system of claim 12, wherein the first relative transform includes a rotation around a fixed point of $\theta$ radians about a unit axis (X, Y, Z).

22. The system of claim 12, wherein the source point cloud and the target point cloud comprise three dimensional point clouds.

23. At least one non-transitory storage media storing instructions that, when executed by at least one processor, cause the at least one processor to perform operations comprising:

generating a fused feature map by at least concatenating a first feature map corresponding to a source point cloud and a second feature map corresponding to a target point cloud, the target point cloud corresponding to at least a portion of a same physical space as the source point cloud;

applying a machine learning model trained to determine, based at least on the fused feature map, a first relative transform aligning the target point cloud to the source point cloud, wherein the first relative transform is used to obtain a coarse point registration of the target point cloud;

generating an aligned target point cloud by at least transforming the target point cloud in accordance with the first relative transform;

applying the machine learning model trained to determine a second relative transform to further align the aligned target point cloud to the source point cloud, wherein the second relative transform is used to obtain a fine point registration of the target point cloud; and determining a trajectory of a vehicle within the physical space based on at least the fine point registration of the target point cloud.

24. The at least one non-transitory storage media of claim 23, wherein the first feature map corresponds to an encoded representation of the source point cloud, and wherein the second feature map corresponds to an encoded representation of the target point cloud.

25. The at least one non-transitory storage media of claim 24, wherein the operations further comprise:

encoding the source point cloud and
the target point cloud such that one or more objects present in each point cloud are represented as one or more pillars, each of the one or more pillars bounding a plurality of points associated with a corresponding object.

26. The at least one non-transitory storage media of claim 23, wherein the operations further comprise:

pre-training the machine learning model prior to training the machine learning model to determine the first relative transform, the pre-training including reconstructing a point cloud by at least decoding an encoding of the point cloud deformed by one or more offsets determined by the machine learning model, and adjusting the machine learning model to minimize a difference between the point cloud and the decoded point cloud; and pre-training, based at least on the difference between the point cloud and the decoded point cloud, an encoder generating the encoding of the point cloud.

27. The at least one non-transitory storage media of claim 23, wherein the machine learning model determines the first relative transform by at least performing a weighted sampling to extract, from the fused feature map, corresponding features from the source point cloud and the target point cloud such that the first feature map and the second feature map are downsampled into a combined feature map.

28. The at least one non-transitory storage media of claim 27, wherein the machine learning model includes a 1×1 convolution layer configured to perform the weighted sub sampling.

* * * * *